United States Patent
Wieszt

[11] Patent Number: 6,029,466
[45] Date of Patent: Feb. 29, 2000

[54] METHOD FOR EVAPORATOR TEMPERATURE CONTROL AS A FUNCTION OF THE OUTSIDE DEW POINT

[75] Inventor: Herbert Wieszt, Grafenau, Germany

[73] Assignee: DaimlerChrysler AG, Japan

[21] Appl. No.: 09/110,163

[22] Filed: Jul. 6, 1998

[30] Foreign Application Priority Data

Jul. 4, 1997 [DE] Germany ............... 197 28 578

[51] Int. Cl.[7] ............................................. F25B 49/02
[52] U.S. Cl. .................................... 62/227; 62/176.6
[58] Field of Search .................... 62/226, 227, 176.6, 62/176.5, 176.3, 228.1, 228.3, 228.4, 228.5

[56] References Cited

U.S. PATENT DOCUMENTS

| | | | |
|---|---|---|---|
| 4,783,970 | 11/1988 | Takahashi | 62/176.3 |
| 5,467,605 | 11/1995 | Hennessee et al. | 62/227 X |

FOREIGN PATENT DOCUMENTS

| | | |
|---|---|---|
| 36 24 171 | 1/1988 | Germany . |
| 37 24 430 | 2/1989 | Germany . |
| 195 17 336 | 11/1995 | Germany . |

*Primary Examiner*—Harry B. Tanner
*Attorney, Agent, or Firm*—Evenson, McKeown, Edwards & Lenahan, P.L.L.C.

[57] ABSTRACT

A method for controlling the evaporator temperature of an air conditioner as a function of the outside dew point, in which the air temperature and the dew point temperature of the incoming air drawn in from outside by the air conditioner for air conditioning an interior are determined. An evaporator demand temperature without reheating is determined from the interior temperature setpoint information. On the one hand, the evaporator temperature is set to a setpoint that, within presettable temperature limits, is selected as the smaller value of the evaporator demand temperature. On the other hand, the evaporator temperature is set to a setpoint that, within presettable temperature limits, is the difference between the air temperature and the dew point temperature of the incoming air on the other. A typical use of the method, for example, is in the air conditioners of motor vehicles.

3 Claims, 2 Drawing Sheets

METHOD FOR EVAPORATOR TEMPERATURE CONTROL AS A FUNCTION OF THE OUTSIDE DEW POINT

BACKGROUND AND SUMMARY OF THE INVENTION

This application claims the priority of German Application No. 197 28 578.3, filed Jul. 4, 1997, the disclosure of which is expressly incorporated by reference herein.

The invention relates to a method for controlling the evaporator temperature of an air conditioner as a function of the outside dew point. Here, the air temperature and dew point temperature of incoming air drawn in from outside by the air conditioner for air-conditioning an interior are determined. An evaporator demand temperature (without reheating) is determined from the setpoint information of the interior temperature.

The term "control" will be understood here in its broader sense and therefore includes, in addition to actual controls without feedback, regulation in which the effect of the control measure on the evaporator temperature itself or parameters influenced thereby (such as the temperature of the incoming air that is guided over the evaporator and blown into the interior, etc.) is detected by a sensor and fed back to a regulating unit. The evaporator demand temperature (without reheating) is determined from setpoint information of the interior temperature, and is the temperature value to which the evaporator temperature must be set when the incoming air blown into the interior is to be conditioned by the action of the evaporator alone(that is, without reheating, as noted). This is so that even the lowest setpoint value specified by the user in a single or multichannel air conditioner for the interior temperature in different interior areas is established without requiring reheating via a heating element connected downstream from the evaporator. This is in contrast to the case for evaporator temperatures that are lower than the demand temperature defined in this fashion.

Methods of this type are used especially in motor vehicle air conditioners. Here, essentially two operating modes are used during cooling operation. In a first operating mode, the evaporator temperature is set to the evaporator demand temperature (without reheating), as determined from the interior temperature setpoint information. This is so that no reheating is necessary and energy consumption is kept to a minimum. However, in many operating situations this results in undesired fogging of the windows. To prevent this, so-called reheating or counter-heating is provided as a second operating mode in which the evaporator temperature is set to a temperature value that is low enough to prevent fogging. This allows moisture to condenses out of the incoming air drawn in at the evaporator. Drier incoming air can be blown out into the interior as a result. Because, in this case, the evaporator temperature is below the evaporator demand temperature (without reheating) that corresponds to the interior temperature setpoint information, the reheating device for compensating for this temperature differential is activated. As a consequence, this operating mode is associated with higher energy consumption.

In a method known from German patent document No. DE 36 24 171 A1 for operating a heating and/or air conditioning system of a motor vehicle, the temperature and humidity of the interior air and/or of the incoming air drawn in from the outside are determined via corresponding temperature and moisture sensors. The temperature and humidity information are used to regulate the air conditioning of the interior. Under these conditions, via a temperature and moisture sensor pair located in the vicinity of the windows, the possibility that the dew point will be undershot at the inside surface of the vehicle windows is detected. An undershot is prevented by countermeasures that include increased ventilation of the inside of the window with incoming air drawn in from the outside. Another countermeasure (during recirculating operation) is performed with air drawn from the interior, with the air blown against the window being suitably conditioned by heating and/or dehumidification.

German patent document No. DE 37 24 430 A1 teaches a motor vehicle air conditioner which can be operated in the two operating modes, continuous cold regulation on the one hand, and reheating operation on the other. As long as the incoming air temperature is higher than the set interior temperature, interior air conditioning is performed by continuous cold regulation. Here, the air blown into the interior is regulated to the temperature at which the air blown into the interior can be held at a temperature that corresponds to the interior temperature setpoint information, without reheating being necessary. This is accomplished by suitably controlling the evaporator temperature by turning a compressor located in the cold circuit line of the evaporator on and off. If the incoming air temperature is between 0° C. and the set interior temperature, air conditioning is performed in a moderate reheating operation in which the evaporator temperature is set to a variable setpoint that is established as a function of the incoming air temperature and the interior temperature setpoint information. Under these conditions, reheating takes place as a function of the deviation of the interior temperature from the setpoint and the evaporator temperature is set so that it is always below the incoming air temperature by a constant value that can be set to a specific value (6° C., for example). The dew point temperatures of the incoming air and the interior air are not taken into account under these conditions.

It is known for example from German patent document No. DE 195 17 336 A1 to limit the setpoint of the evaporator temperature in a motor vehicle air conditioner for limiting odors to a presettable maximum value.

It is an object of the present invention to provide a method for controlling the evaporator temperature of an air conditioner as a function of the outside dew point, with which comparatively energy-saving interior air conditioning can be achieved. Simultaneously, the occurrence of disturbing condensation effects, especially precipitation on the outside surfaces of windows in the case of a motor vehicle air conditioning system can be avoided.

This and other objects and advantages are achieved by the method, according to the present invention, by controlling the evaporator temperature of an air conditioner as a function of the outside dew point, especially in a motor vehicle air conditioner, in which the air temperature and the dew point temperature of the incoming air drawn in from outside by the air conditioner for air conditioning an interior are determined and an evaporator demand temperature (without reheating) is determined from the interior temperature setpoint information. Here, the evaporator temperature is set to a setpoint that is chosen within presettable temperature limits as the smaller value of the evaporator demand temperature without reheating determined from the interior temperature setpoint information, on the one hand, and the difference between the air temperature and the dew point temperature of the incoming air blown into the interior and drawn in from the outside, on the other. With high outside humidity, the air temperature and dew point temperature of the incoming air are approximately the same so that the difference is approximately 0° C., and hence is less than the evaporator demand temperature. Consequently, in this situation the evaporator temperature is likewise set to a setpoint close to 0° C. The setpoint is thus advantageously limited at the lower end by a minimum icing protection temperature that can be set in advance in order to avoid undesired icing phenomena in the evaporator. Hence, the evaporator is set to maximum dehumidification when the outside humidity is high. As a result, when it is used in a motor vehicle air conditioner, for example, fogging of the windows is reliably prevented. If this does occur when the incoming air that has been drawn in is cooled too sharply for the desired interior temperature, this is compensated for by reheating.

When the outside humidity is low, the difference between the air temperature and the dew point temperature of the incoming air increases and the evaporator temperature setpoint is raised accordingly, so that less reheating power is required and energy is saved. As soon as this temperature differential reaches the value of the evaporator demand temperature corresponding to the lowest (possibly one of several) interior temperature setpoints provided in advance, the evaporator temperature setpoint is set to this demand temperature value and no reheating is required any longer.

In certain preferred embodiments of the present invention, the evaporator temperature setpoint is limited at the upper end by a presettable odor-avoiding maximum temperature. This maximum temperature is generally below the maximum temperature possible for the air conditioner itself. As a result, conditions are created such that excessive evaporator odors which are caused by the change between the dry and wet states of the evaporator surface do not develop.

Other objects, advantages and novel features of the present invention will become apparent from the following detailed description of the invention when considered in conjunction with the accompanying drawing.

DETAILED DESCRIPTION OF THE DRAWINGS

Figure 1:
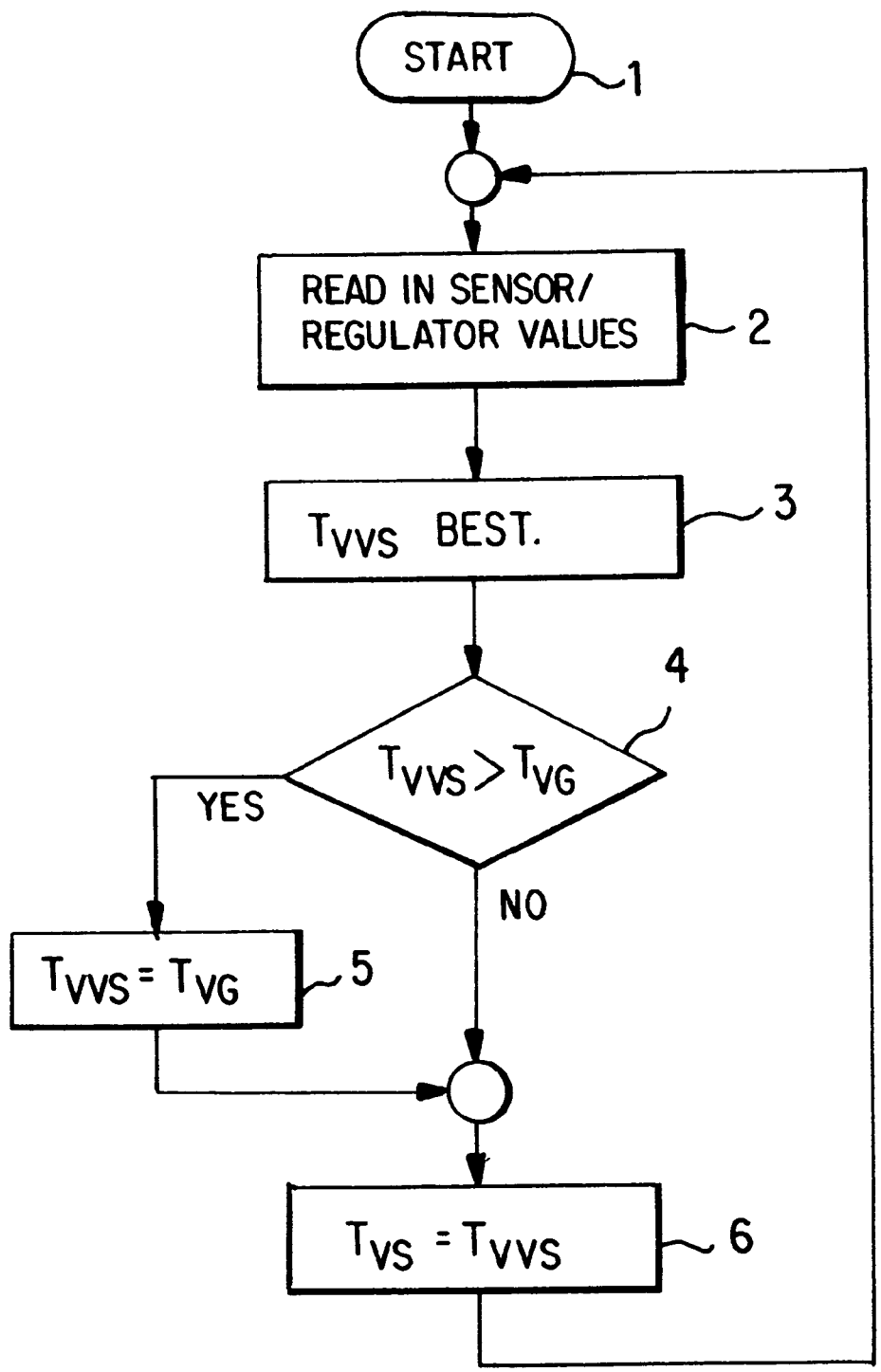
FIG. 1 shows a flowchart of a method for controlling the evaporator temperature of an air conditioner as a function of the outside dew point.

The method, whose essential steps are illustrated in the FIG. 1, is especially suited for motor vehicle air conditioners of a conventional design that comprise a cooling circuit with a compressor that can be cut in and out or whose power can be regulated either in steps or continuously, and an evaporator. In a conventional design, the evaporator, together with a dust/pollen filter, an activated charcoal filter, a heating element used for reheating (in the form of a heat conductor or electrical heating element, for example), and flap adjusting elements for controlling the air volume and airflow direction are located in an air conditioner housing in the vicinity of the firewall of an automobile. An air conditioner operating device serves as a control and/or regulating unit, and controls the compressor and the heating element in particular as a function of settings made by the user on an operating unit in such fashion that the desired air conditioning effect is achieved in the vehicle interior. As additional relevant input parameters, the various output signals from an associated air conditioner sensor system are supplied to the air conditioner operating device.

For the present method, in particular, a sensor measures the air temperature $T_A$ of the incoming air drawn in, i.e., the outside temperature. A sensor for measuring evaporator temperature $T_V$, a sensor for measuring the temperature of the heating element connected downstream from the evaporator, and an outside dew point temperature sensor system are required. The latter can consist in conventional fashion of a uniform dew point sensor or a combination of an air temperature sensor and a moisture sensor, and serves to determine the dew point temperature $T_P$ of the outside air, i.e., the incoming air that is drawn in. In this case, the determination is made by the sensor system itself or by the air conditioner operating device, with suitable evaluation of the air temperature and humidity information.

Conventional locations for an outside air sensor, for example, are in the front of the vehicle and, in the case of an outside dew point temperature sensor, in the intake air duct which typically leads from the air conditioner housing to the area in front of the windshield.

In conventional vehicle air conditioning units, the cold compressor is usually mechanically coupled to the vehicle drive motor. It can be controlled, in terms of its compressing power, by the air conditioner operating device, for example, by simple cyclic switching on and off. It can also be controlled by changes in power that are continuous or in stages. Since the compressor power in turn determines the cooling effect of the evaporator, the air conditioner operating device delivers a power setting signal to the compressor that represents a corresponding pre set evaporator temperature setpoint $T_{KV}$.

In the method according to the invention described in greater detail below with reference to FIG. 1, the air conditioner operating device determines an evaporator temperature setpoint $T_{KV}$ that is adapted to the situation at hand. The air conditioner operating device attempts to adjust the actual evaporator temperature $T_V$ supplied to it by the output signal of the evaporator temperature sensor, by appropriately controlling the compressor. In the steady state therefore, the evaporator preset temperature value $T_{KV}$ for the compressor is equal to the evaporator temperature $T_V$, and this in turn is equal to its setpoint $T_{VS}$, i.e., $T_{VS}=T_V=T_{XV}$.

Typically, in the air conditioner operating device, the method shown in FIG. 1 is used to select the respective evaporator temperature setpoint $T_{VS}$. This incorporates a starting step 1 followed by a step 2 in which the required sensor and regulator values are "read in", i.e., the various output signals of the air conditioner system sensors, together with the various settings made by the user on the operating unit.

In a following step 3, the preliminary evaporator temperature setpoint $T_{VVS}$ is determined by the air conditioner operating device. For this purpose, the intake air dew point temperature $T_P$ is initially determined directly. This is accomplished by reading the output signal from an outside dew point sensor, or by reading the output signals of an intake air temperature sensor and an intake air moisture sensor. Concurrently, an evaporator demand temperature value $T_{VA}$ is read which is determined by an air conditioner regulator that is part of the air conditioner operating device. This evaporator demand temperature $T_{VA}$ is the temperature value that the evaporator must have, so that the incoming air drawn in from the outside and blown out into the interior without reheating can be precisely cooled to the lowest of possibly several interior temperature setpoints specified by the user. The difference $T_A-T_P$ between the measured air temperature $T_A$ and the dew point temperature $T_P$ of the incoming air is then calculated and compared with the evaporator demand temperature $T_{VA}$ that has been determined. Next, the smaller of these two values is chosen as the preliminary evaporator temperature setpoint $T_{VVS}$, i.e., the preliminary evaporator temperature setpoint $T_{VS}$ is determined by the relationship $T_{VVS}=\min(T_{VA}, T_A-T_P)$.

If the preliminary evaporator temperature setpoint $T_{VVS}$ determined in this fashion is below a preset minimum icing protection temperature, it is set to the latter. In this fashion, the preliminary evaporator temperature setpoint $T_{VVS}$ is limited at the lower end to a minimum temperature that is specified such that undesired icing phenomena in the evaporator are prevented.

In a subsequent interrogation step 4, a check is made to determine whether the preliminary evaporator temperature setpoint $T_{VVS}$ thus determined is higher than a predetermined maximum odor avoidance temperature $T_{VG}$. If this is the case, the preliminary evaporator temperature setpoint $T_{VVS}$ is set with an upper limit to this predetermined maximum odor avoidance temperature $T_{VG}$ (step 5). This maximum temperature is then adjusted so that the evaporator odors that can occur, primarily when changing between wet and dry states of the evaporator surface and especially at higher evaporator temperatures, do not exceed a certain tolerable level.

At this point, the evaporator temperature setpoint $T_{VS}$, which eventually serves to set the evaporator temperature, is adjusted to the preliminary evaporator temperature setpoint $T_{VVS}$ (step 6). This is set below the maximum odor avoidance temperature $T_{VG}$, or possibly established as limiting the avoidance temperature $T_{VG}$ at the upper end. The air conditioner operating device then delivers to the compressor the power setting signal that corresponds to this evaporator temperature setpoint $T_{VS}$, as its evaporator preset temperature value $T_{KV}$. This procedure is repeated cyclically by returning to a point before step 2 in the method shown.

The method according to the invention for controlling the evaporator temperature as a function of the outside dew point avoids precipitation on vehicle windows caused by the interior air conditioning. This is especially true on the vehicle window's exterior. At the same time, air conditioning is performed with a relatively low expenditure of energy. When the outside humidity is high, the incoming air dew point temperature $T_P$ roughly corresponds to the air temperature $T_A$ of the incoming air, so that the difference is approximately 0° C. Because the evaporator demand temperature $T_{VA}$ is usually much higher, in this situation according to the method, an evaporator temperature setpoint close to 0° that is possibly limited at the lower end to the minimum icing protection temperature is chosen for evaporator operation. This means that the evaporator is set to maximum dehumidifying power so that reliable prevention of precipitation on the vehicle's windows is achieved, despite the high outside humidity. The difference between the setpoint required to achieve the desired interior temperature of the incoming air blown into the interior and the incoming air temperature at the outlet of the evaporator, which is lower because of the maximum evaporator power, is compensated by appropriate activation of the reheating device.

On the other hand, in operating phases with low outside humidity levels, the difference $T_A-T_P$ between the air temperature $T_A$ and the dew point temperature $T_P$ of the incoming air increases. Accordingly, the preliminary evaporator temperature setpoint $T_{VVS}$ and the actual evaporator temperature setpoint $T_{VS}$ can both rise. In this case, less energy is required for reheating, and reliable prevention of precipitation on windows is achieved. In any event, the evaporator temperature setpoint $T_{VS}$ remains limited at the upper end by the maximum odor avoidance temperature in order to prevent irritating evaporator odors in the interior.

When the difference $T_A-T_P$ between the air temperature $T_A$ and the dew point temperature $T_P$ of the incoming air exceeds the evaporator demand temperature value $T_{VA}$, the latter is used as the evaporator temperature setpoint $T_{VS}$. As a result, according to the invention, no additional reheating is required in order to reach the desired interior temperature and thus the interior air conditioning in these situations can be effected with minimum energy consumption.

The above description of an advantageous embodiment shows that with the method according to the invention, the evaporator temperature of an air conditioner can be controlled as a function of the outside dew point in such a manner that interior air conditioning can be performed with an energy consumption that is as low as possible and at the same time without the development of irritating condensation effects. Of course, in addition to the method according to the invention, additional operating methods can be provided in an air conditioner that are better suited for other situations, and a choice can be made between them by a suitable operating mode change. It is also clear that the method according to the invention is not limited to use in motor vehicle air conditioners but is also suitable for all air conditioners that have a compressor-evaporator coolant circuit in which incoming air is drawn in from outside and, after conditioning, is blown out into an interior to be air-conditioned. Here, the modification measures, in contrast to the above example, are readily apparent to individuals skilled in the art for the specific application. The maximum odor avoidance temperature can be made variable if necessary, depending on the situation, and of course can be made dependent upon the respective air conditioning system. A typical choice for the maximum odor avoidance temperature $T_{VA}$ is about 12° C., for example.

Figure 2:
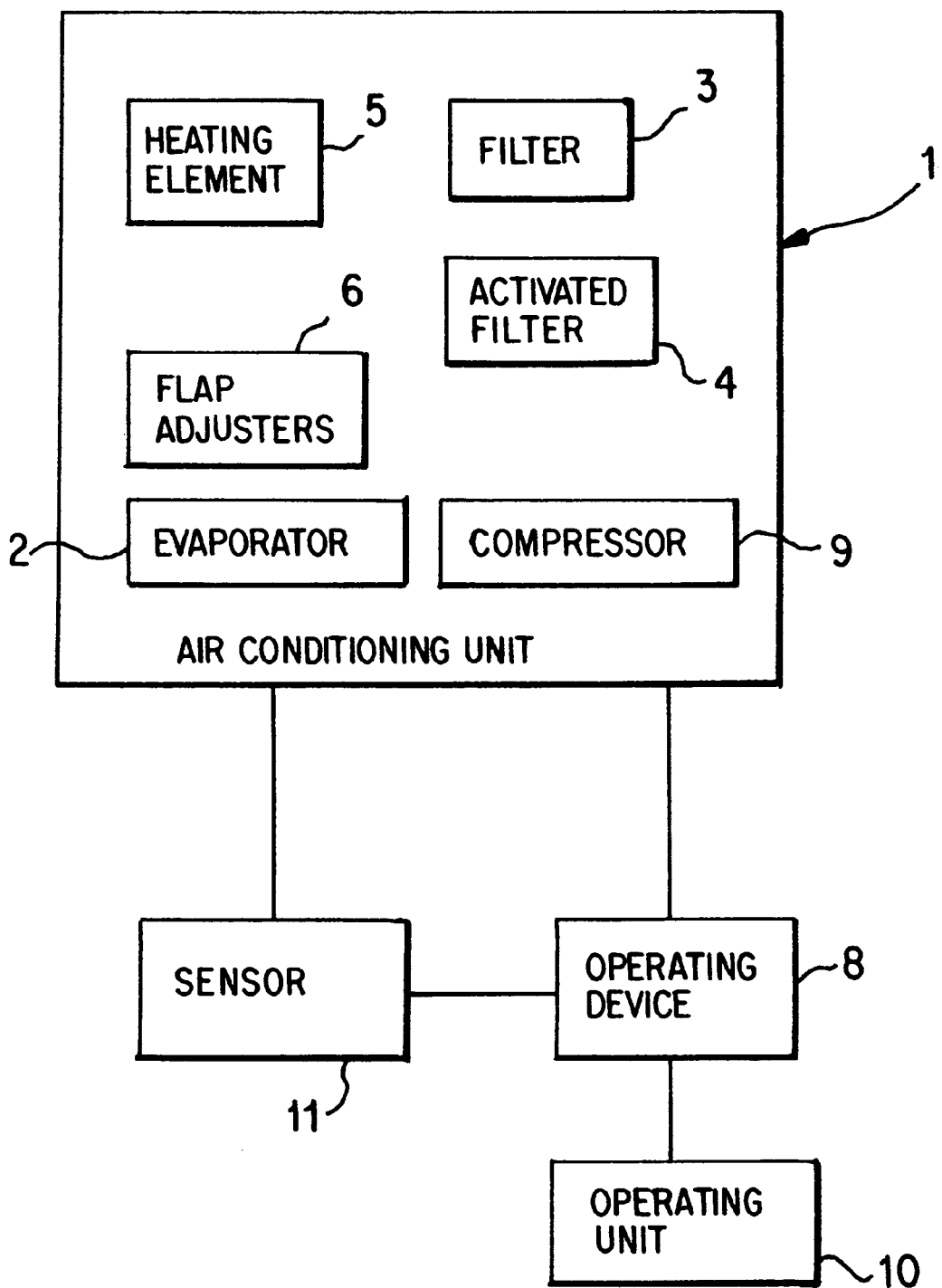
FIG. 2 is a schematic block diagram of an apparatus for implementing the method according to the invention.

FIG. 2 is a schematic diagram of the apparatus for implementing the method of the present invention. An air conditioning unit 1 is connected to a sensor 8. Shown in the air conditioning unit 1 is an evaporator 2, a dust/pollen filter 3, an activated charcoal filter 4, a heating element 5 used for reheating (in the form of a heat conductor or electrical heating element, for example), and flap adjusting elements 6 for controlling the air volume and airflow direction. An air conditioner operating device 8 serves as a control and/or regulating unit, and controls the compressor 9 and the heating element 5. The control of the compressor 9 and the heating element 5 is based on settings made by the user on an operating unit 10 in such a manner that the desired air conditioning effect is achieved in the vehicle interior. As additional relevant input parameters, the various output signals from an associated air conditioner sensor system 11 are supplied to the air conditioner operating device. The apparatus permits the implementation of the method according to the invention for determining the air temperature and the dew point temperature of intake air drawn in from outside by the air conditioner for air conditioning the interior of a vehicle's passenger compartment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling an evaporator temperature of an air conditioner as a function of the outside dew point, comprising the acts of:

determining an air temperature ($T_A$) and a dew point temperature ($T_P$) of incoming air drawn in from outside by the air conditioner;

determining an evaporator demand temperature ($T_{VA}$) without reheating from an interior temperature setpoint information;

setting the evaporator temperature ($T_V$) to a setpoint ($T_{VS}$); and choosing the setpoint ($T_{VS}$) within presettable temperature limits as the smaller value of the evaporator demand temperature ($T_{VA}$) and the difference between the air temperature ($T_A$) and the dew point temperature ($T_P$) of the incoming air.

2. The method according to claim 1, further comprising the act of:

limiting an upper limit of the evaporator temperature setpoint ($T_{VS}$) to a presettable odor avoidance maximum temperature.

3. The method according to claim 1, wherein the air conditioner is a motor vehicle air conditioner.

* * * * *